(12) United States Patent
Okano et al.

(10) Patent No.: US 7,091,962 B2
(45) Date of Patent: Aug. 15, 2006

(54) VIDEO DISPLAY APPARATUS AND VIDEO DATA CREATION APPARATUS

(75) Inventors: Akihiro Okano, Fukuroi (JP); Haruo Watari, Fukuroi (JP); Takashi Furuno, Fukuroi (JP); Hideo Ishiyama, Fukuroi (JP); Tatsuya Akiba, Fukuroi (JP); Jun Iizuka, Fukuroi (JP); Hidehisa Ueda, Tokyo-to (JP); Makoto Aizawa, Long Beach, CA (US); Joshua Kairoff, Long Beach, CA (US)

(73) Assignee: Pioneer Corporation, Tokyo-To (JP)

( * ) Notice: Subject to any disclaimer, the term of this patent is extended or adjusted under 35 U.S.C. 154(b) by 211 days.

(21) Appl. No.: 10/401,687

(22) Filed: Mar. 31, 2003

(65) Prior Publication Data

US 2003/0184536 A1    Oct. 2, 2003

(30) Foreign Application Priority Data

Apr. 2, 2002  (JP) ............................ P2002-099980

(51) Int. Cl.
 *G09G 5/00*  (2006.01)
(52) U.S. Cl. ...................................... 345/173; 710/303
(58) Field of Classification Search ........ 345/173–179; 710/303
 See application file for complete search history.

(56) References Cited

U.S. PATENT DOCUMENTS 4,763,356 A * 8/1988 Day et al. .................... 379/368

5,600,800 A    2/1997 Kikinis et al. ................ 395/281
6,587,099 B1 * 7/2003 Takekawa .................... 345/175

FOREIGN PATENT DOCUMENTS

| EP | 0 896 318 | 2/1999 |
|----|-----------|--------|
| JP | 03-92887 | 9/1991 |
| JP | 06-214718 | 8/1994 |
| JP | 07-162784 | 6/1995 |
| JP | 08-331662 | 12/1996 |
| JP | 10-126705 | 5/1998 |
| JP | 2002-027348 | 1/2002 |

* cited by examiner

*Primary Examiner*—Amr A. Awad
*Assistant Examiner*—Steven Holton
(74) *Attorney, Agent, or Firm*—Drinker Biddle & Reath LLP

(57) ABSTRACT

There is disclosed an information display apparatus in which a control apparatus main body for controlling a plasma display apparatus for displaying video can disconnectably be connected to a substrate for outputting video data toward the control apparatus main body via a connector. The substrate includes: a RAM and ROM in which information is stored; a video control unit which uses the information to create the video data; and a CPU for controlling the RAM, ROM, and video control unit, the control apparatus main body includes a power source unit for supplying power to the substrate, and the power source unit is connected to the substrate via the connector.

5 Claims, 2 Drawing Sheets

VIDEO DISPLAY APPARATUS AND VIDEO DATA CREATION APPARATUS

BACKGROUND OF THE INVENTION

1. Field of the Invention

The present invention relates to an information display apparatus which displays video based on information stored in storage device, and a video data creation apparatus which can constitute the information display apparatus.

2. Description of the Related Art

A conference system is known in which a personal computer is combined with a display apparatus and video created beforehand can be used to make a presentation. Information necessary for displaying the video is stored in a storage medium in a readable state by the personal computer, or transmitted to the personal computer via a communication system. Moreover, the conference system also includes an example in which a touch panel is disposed on a screen of the display apparatus to use the screen of the display apparatus like a whiteboard.

In the above-described conference system, some application software is used to create video data of the video for use beforehand, and the created video data is used to display the video. To display the video, after starting the application necessary for displaying the video, an instruction is given on the application by an input operation with respect to the personal computer, so that the necessary video can successively be displayed. However, if a version of the application software with which the video has been created does not correspond to that of the application software for displaying the video, or settings on the software conflict with each other, there is a possibility that the video cannot appropriately be displayed.

SUMMARY OF THE INVENTION

An object of the present invention is to provide an information display apparatus and video data creation apparatus which are satisfactory in handiness and which do not cause any trouble in using created video data to display video.

In one aspect of the present invention, there is provided a video display apparatus (2) comprising: a display control unit (2A) which controls a display apparatus (1) for displaying video; and a video data creation unit (2B) which outputs video data toward the display control unit (2A), the display control unit being connected to the video data creation unit via a connector (50) so that the units can be attached/detached with respect to each other. The video data creation unit (2B) comprises a storage device (12, 13) which stores information, a data creation device (14) which uses the information recorded in the storage device (12, 13) to create the video data, and a control device (11) which controls the storage device (12, 13) and data creation device (14). The display control unit (2A) comprises a power supply device (35) which supplies power to the video data creation unit (2B). The power supply device (35) is connected to the video data creation unit (2B) via the connector (50).

According to this aspect, the display control unit for controlling the display apparatus is connected to the video data creation unit for outputting the video data toward the display control unit via the connector so that the units can be attached/detached with respect to each other. The video data creation unit comprises the storage device which stores the information, data creation device which creates the video data, and control device which controls the storage device and data creation device. Therefore, even when the video data creation unit is detached in order to store new information into the storage device, or even when the video is displayed in another video display apparatus, the information stored in the storage device can be used to easily and securely display the video. Moreover, since the video data creation unit can be disconnected from the power supply device via the connector, the video data creation unit can be compact and lightweight, and can easily be carried. It is to be noted that the information stored in the storage device includes all the information for use in creating the video, and is not limited to the video data of the video to be displayed.

In another aspect of the present invention, the display control unit (2A) comprises the display apparatus (1) which displays the video, and detection device (5) which detects contact or access of a member into a display screen of the display apparatus (1). The detection device (5) is connected to the control device (11) via the connector or another connector (50). The control device (11) controls the data creation device (14) so that the video data is created based on the information from the detection device (5).

According to this aspect, when the detection device is used as input device, a user can execute a necessary input operation by an intuitive operation.

In further aspect of the present invention, there is provided a video display apparatus comprising: a display control unit (2A) which controls a display apparatus for displaying video; and a video data creation unit (2B) which outputs video data toward the display control unit (2A), the display control unit being connected to the video data creation unit via a connector (50) so that the units can be attached/detached with respect to each other. The video data creation unit (2B) comprises a storage device (12, 13) which stores information, data creation device (14) which uses the information recorded in the storage device (12, 13) to create the video data, and control device (11) which controls the storage device (12, 13) and data creation device (14). The display control unit (2A) comprises the display apparatus (1) which displays the video, and detection device (5) which detects contact or access of a member (5A) into a display screen of the display apparatus (1). The detection device (5) is connected to the control device (11) via the connector or another connector (50). The control device (11) controls the data creation device (14) so that the video data is created based on the information from the detection device (5).

According to this aspect, the display control unit for controlling the display apparatus is connected to the video data creation unit for outputting the video data toward the display control unit via the connector so that the units can be attached/detached with respect to each other. The video data creation unit comprises the storage device which stores the information, data creation device which creates the video data, and control device which controls the storage device and data creation device. Therefore, even when the video data creation unit is detached in order to store new information into the storage device, or even when the video is displayed in another video display apparatus, the information stored in the storage device can be used to easily and securely display the video. Moreover, since the video data creation unit can be disconnected from the detection device via the connector, the video data creation unit can be compact and lightweight, and can easily be carried. It is to be noted that the information stored in the storage device includes all the information for use in creating the video, and is not limited to the video data of the video to be displayed.

In further aspect of the present invention, the data creation device (14) creates the video data such that a track of the member (5A) is drawn in the display screen in response to the contact or access of the member (5A) detected by the detection device (5).

According to this aspect, the display screen of the display apparatus can be used like a whiteboard.

In further aspect of the present invention, program which defines control processing by the control device (11) is stored in the storage device (12, 13).

According to this aspect, the program can constantly be stored in the video data creation unit. Therefore, even when the video data creation unit is used to display the video in another video display apparatus, a trouble of reading the necessary program is not necessary, and the appropriate video can easily and securely be displayed.

In further aspect of the present invention, the display apparatus is a plasma display panel. As the display apparatus, various flat displays such as a CRT and liquid crystal display is used.

In one aspect of a video data creation apparatus of the present invention, there is provided a video data creation apparatus (2B) comprising a video display apparatus constituted by connecting a display control unit (2A) which controls a display apparatus (1) for displaying video to the video data creation apparatus (2B) which outputs video data toward the display control unit (2A) via a connector (50) so that the unit and apparatus can be attached/detached with respect to each other. The video data creation apparatus (2B) comprises a storage device (12, 13) which stores information, data creation device (14) which uses the information recorded in the storage device (12, 13) to create the video data, and control device (11) which controls the storage device (12, 13) and data creation device (14). The display control unit (2A) comprises a power supply device (35) which supplies power to the video data creation unit (2B). The power supply device (35) is connected to the video data creation apparatus (2B) via the connector (50).

According to this aspect, the display control unit for controlling the display apparatus is connected to the video data creation apparatus which outputs the video data toward the display control unit via the connector so that the unit and apparatus can be attached/detached with respect to each other. The video data creation apparatus comprises the storage device which stores the information, data creation device which creates the video data, and control device which controls the storage device and data creation device. Therefore, even when the video data creation apparatus is detached in order to store new information into the storage device, or even when the video is displayed in another video display apparatus, the information stored in the storage device can be used to easily and securely display the video. Moreover, since the video data creation apparatus can be disconnected from the power supply device via the connector, the video data creation apparatus can be compact and lightweight, and can easily be carried. It is to be noted that the information stored in the storage device includes all the information for use in creating the video, and is not limited to the video data of the video to be displayed.

In another aspect of a video data creation apparatus of the present invention, there is provided a video data creation apparatus comprising a video display apparatus constituted by connecting a display control unit (2A) which controls the display apparatus (1) for displaying video to the video data creation apparatus (2B) which outputs video data toward the display control unit (2A) via a connector so that the unit and apparatus can be attached/detached with respect to each other. The video data creation apparatus (2B) comprises a storage device (12, 13) which stores information, data creation device (14) which uses the information recorded in the storage device (12, 13) to create the video data, and control device (11) which controls the storage device (12, 13) and data creation device (14). The display control unit (2A) comprises the display apparatus (1) which displays the video, and detection device (5) which detects contact or access of a member (5A) into a display screen of the display apparatus (1). The detection device (5) is connected to the control device (11) via the connector (50). The control device (11) controls the data creation device (14) so that the video data is created based on the information from the detection device (5).

According to this aspect of a video creation apparatus, the display control unit for controlling the display apparatus is connected to the video data creation apparatus for outputting the video data toward the display control unit via the connector so that the unit and apparatus can be attached/detached with respect to each other. The video data creation apparatus comprises the storage device which stores the information, data creation device which creates the video data, and control device which controls the storage device and data creation device. Therefore, even when the video data creation apparatus is detached in order to store new information into the storage device, or even when the video is displayed in another video display apparatus, the information stored in the storage device can be used to easily and securely display the video. Moreover, since the video data creation apparatus can be disconnected from the detection device via the connector, the video data creation apparatus can be compact and lightweight, and can easily be carried. It is to be noted that the information stored in the storage device includes all the information for use in creating the video, and is not limited to the video data of the video to be displayed.

In further aspect of a video data creation apparatus of the present invention, program which defines control processing by the control device (11) may be stored in the storage device (12, 13).

According to this aspect, the program can constantly be stored in the video data creation apparatus. Therefore, even when the video data creation apparatus is used to display the video in another video display apparatus, a trouble of reading the necessary program is not necessary, and the appropriate video can easily and securely be displayed.

It is to be noted that for ease of understanding the present invention, reference numerals of the accompanying drawings are attached in parentheses, but this does not limit the present invention to shown modes.

DESCRIPTION OF THE PREFERRED EMBODIMENT

One embodiment of an information display apparatus according to the present invention will be described hereinafter with reference to FIGS. 1 and 2.

Figure 1:
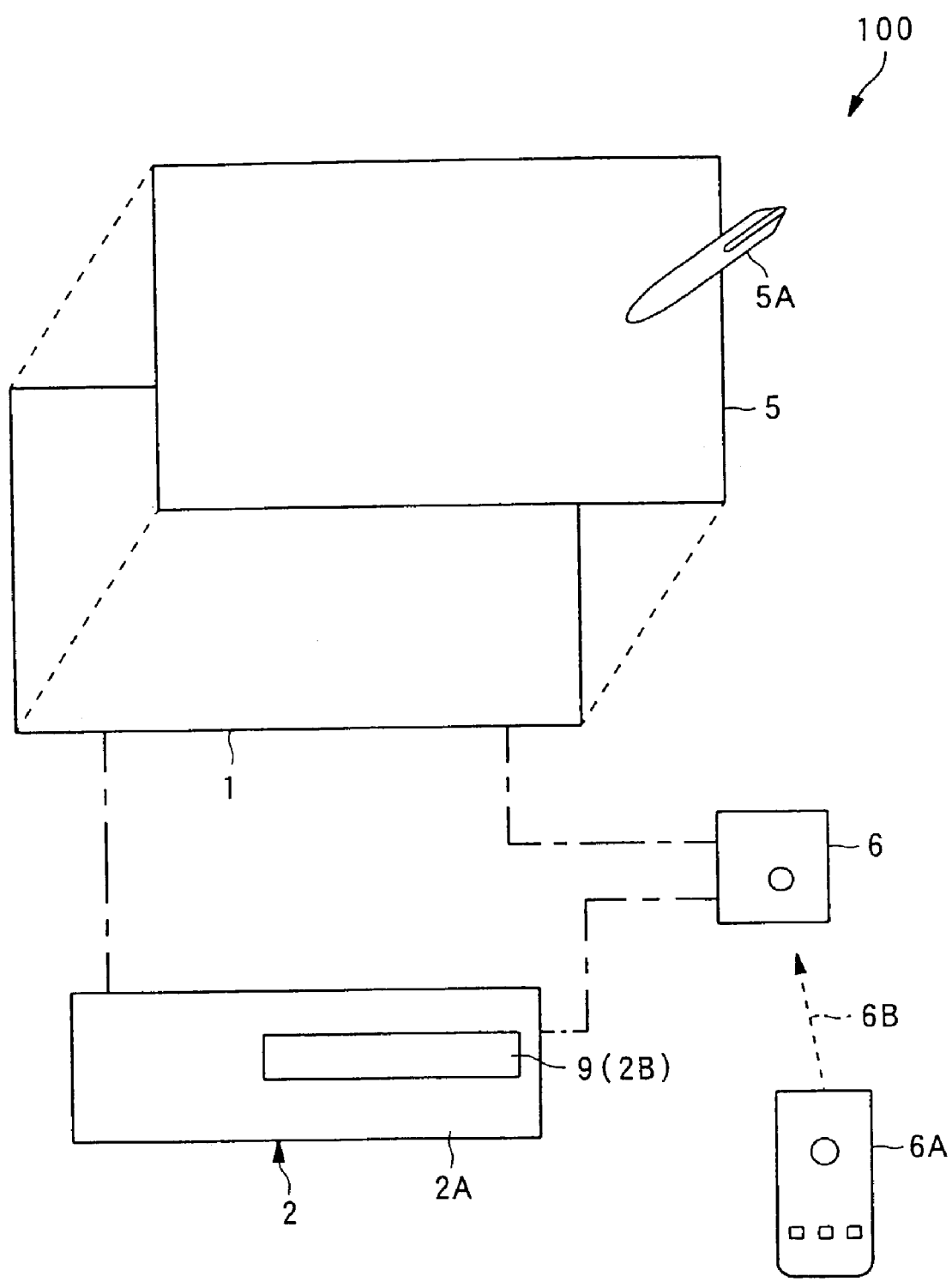
FIG. 1 is a diagram schematically showing an outline of an information display apparatus according to the present embodiment.

FIG. 1 is a diagram schematically showing an outline of the information display apparatus according to the present embodiment. As shown in FIG. 1, an information display apparatus 100 according to the present embodiment includes a plasma display apparatus 1 in which a plasma display panel is used, and a plasma control apparatus 2 included in the plasma display apparatus 1. The plasma display apparatus 1 is controlled by the plasma control apparatus 2.

As shown in FIG. 1, a transparent touch panel 5 is disposed on a display screen of the plasma display apparatus 1. The touch panel 5 is equipped with a pen 5A for exclusive use. When the pen 5A is slid on the surface of the touch panel 5a, a track of the pen 5A is synchronized and drawn in the screen of the plasma display apparatus 1, and the plasma display panel can thereby be used like a whiteboard. Moreover, in another way of use, when the pen 5A is brought into contact with the screen, a button on the screen can be selected.

Furthermore, as shown in FIG. 1, an infrared light receiving apparatus 6 is connected to the plasma display apparatus 1 and plasma control apparatus 2. When a remote controller 6A emits an infrared light 6B toward the infrared light receiving apparatus 6, various operations can be performed with respect to the plasma display apparatus 1. Additionally, it is possible to perform various input operations which are necessary for an instruction to start a desired application software with respect to the plasma control apparatus 2 or for execution of the application software.

Figure 2:
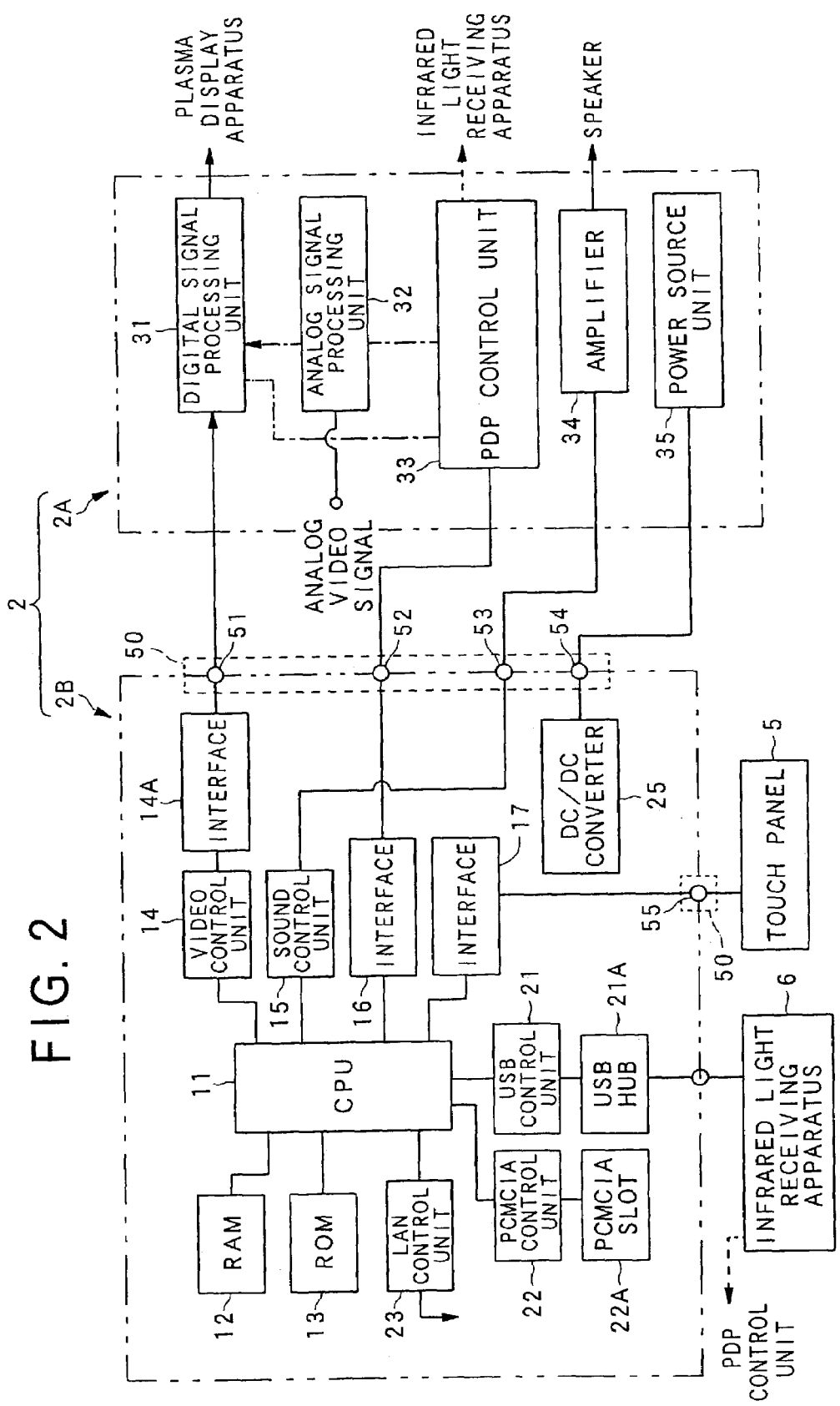
FIG. 2 is a block diagram showing a constitution of a plasma control apparatus.

FIG. 2 is a block diagram showing a constitution of the plasma control apparatus 2. As shown in FIG. 2, the plasma control apparatus 2 includes a control apparatus main body 2A (FIG. 1) attached to the plasma display apparatus 1, and a substrate 2B connected to a circuit of the control apparatus main body 2A via a slot 9 (FIG. 1) disposed in the control apparatus main body 2A.

As shown in FIG. 2, the substrate 2B includes: a CPU 11 for controlling the operation of the plasma control apparatus 2; a RAM 12 in which video data and various data necessary for executing the application software are stored; a ROM 13 in which program necessary for processing in the CPU 11 and various data are stored; a video control unit 14 for creating and outputting the video data; an interface 14A for receiving a video signal outputted from the video control unit 14; a sound control unit 15 for outputting a sound signal; an interface 16 connected to a PDP control unit described later; and an interface 17 connected to the touch panel 5. In the ROM 13, program for an operating system (OS), and program for various types of application software operating on the operating system are also stored.

Moreover, on the substrate 2B, there are mounted: a USB hub 21A for connecting an external apparatus to the substrate; a USB control unit 21 for controlling the USB hub 21A; a personal computer memory card international association (PCMCIA) slot 22A to which a PCMCIA card is to be attached; a PCMCIA control unit 22 for controlling the PCMCIA slot 22A; a local area network (LAN) control unit 23 for controlling communication of data on the LAN; and a DC/DC converter 25 connected to a power source unit 35 described later to supply power to each component of the substrate 2B. As shown in FIG. 2, the infrared light receiving apparatus 6 is connected to the USB hub 21A. Moreover, as omitted from the drawing, the USB hub 21A can be connected to the external apparatuses such as a printer, memory card reader, keyboard, and mouse.

The RAM 12, ROM 13, video control unit 14, sound control unit 15, interfaces 16 and 17, USB control unit 21, PCMCIA control unit 22, and LAN control unit 23 are connected to the CPU 11, and controlled by the CPU 11.

It is to be noted that the plasma control apparatus 2 can be connected to Internet via LAN, and can use Internet to monitor situations of hardware such as the plasma display apparatus 1 and touch panel 5 in a remote area. Therefore, control and trouble diagnosis from the remote area are possible.

As shown in FIG. 2, the control apparatus main body 2A includes: a digital signal processing unit 31 for processing a digital video signal from the substrate 2B to output the video signal toward the plasma display apparatus 1; an analog signal processing unit 32 for transferring an analog video signal to the digital signal processing unit 31; a PDP control unit 33 for controlling the digital signal processing unit 31 and analog signal processing unit 32; an amplifier 34 for amplifying a sound signal to output the signal toward a speaker; and the power source unit 35 for supplying power to the control apparatus main body 2A and substrate 2B.

The digital signal processing unit 31 and analog signal processing unit 32 are connected to the PDP control unit 33, and controlled by the PDP control unit 33. Moreover, the PDP control unit 33 is connected to the infrared light receiving apparatus 6.

As shown in FIG. 2, the control apparatus main body 2A is connected to the substrate 2B via a connector 50 constituted of a connection terminal group disposed in the end of the substrate 2B and a connection piece group (not shown) disposed in the slot 9. When the substrate 2B is attached to the slot 9, the connection in the connector 50 is maintained. When the substrate 2B is detached from the slot 9, the connector has an open state.

The connector 50 includes: a connection portion 51 for connecting the interface 14A of the substrate 2B to the digital signal processing unit 31 of the control apparatus main body 2A; a connection portion 52 for connecting the interface 16 of the substrate 2B to the PDP control unit 33 of the control apparatus main body 2A; and a connection portion 53 for connecting the sound control unit 15 of the substrate 2B to the amplifier 34 of the control apparatus main body 2A. Moreover, the connector 50 also includes a connection portion 54 for connecting the DC/DC converter 25 of the substrate 2B to the power source unit 35 of the control apparatus main body 2A. Furthermore, a connection portion 55 for connecting the interface 17 of the substrate 2B to the touch panel 5 is disposed in the connector 50.

As shown in FIG. 2, the CPU 11 of the substrate 2B is connected to the PDP control unit 33 of the control apparatus main body 2A via the connector 50, so that the CPU can communicate with the control unit.

Next, an operation of the information display apparatus 100 according to the present embodiment will be described.

In a state in which the substrate 2B is inserted in the slot 9 of the PDP control apparatus 2, a power switch (not shown) of the power source unit 35 of the control apparatus main body 2A is turned on. Then, the power is supplied to the respective components of the control apparatus main body 2A and substrate 2B. The DC/DC converter 25 of the substrate 2B converts an output voltage of the power source unit 35 to a predetermined voltage, and supplies the voltage to each component of the substrate 2B.

In the information display apparatus 100 of the present embodiment, an operating system (OS) is used in which predetermined application can be started only by turning on the power source. Therefore, after elapse of a constant time from the operation of turning on the power source, a state can be obtained in which an input operation on the application software can be accepted. It is to be noted that the operation of turning on the power source can be performed using the remote controller 6A.

In the present embodiment, the video signal is generated based on information stored in the RAM 12 or ROM 13 by the started application software, and the video is displayed in the display screen of the plasma display apparatus 1. In this case, the information stored in the RAM 12 or ROM 13 may be video data of the video to be displayed in the plasma display apparatus 1, or information (e.g., numeric data for executing graph display) indicating the video which can be created via the application software. In brief, some information for use in the video to be displayed in the plasma display apparatus 1 is stored in the RAM 12 or ROM 13. This information can also be written in the RAM 12 on the application software. Moreover, examples of the data include video data created using another application software, video data read by a digital camera or scanner, and video data created by editing the read image by appropriate application software.

The video control unit 14 creates the video based on the information read from the RAM 12 or ROM 13. The video data created by the video control unit 14 is outputted as the digital video signal via the interface 14A. As shown in FIG. 2, the digital video signal outputted from the interface 14A is inputted into the digital signal processing unit 31 of the control apparatus main body 2A via the connector 50, and the video is displayed in the plasma display apparatus 1.

On the other hand, a coordinate value of the pen 5A in contact with the surface of the touch panel 5 is inputted into the CPU 11 of the substrate 2B via the interface 17. The video control unit 14 creates the video data indicating a track of the pen 5A based on this coordinate value in real time. The video data is sent as the digital video signal to the digital signal processing unit 31 via the interface 14A, and the track of the pen 5A is drawn in the plasma display apparatus 1 in real time. Therefore, the display of the plasma display apparatus 1 can be used instead of the whiteboard.

Moreover, when the pen 5A is brought into contact with the button displayed in the screen on the application software, the processing assigned to the button can be selected. Furthermore, in the information display apparatus 100 according to the present embodiment, the processing on the application software is controlled in response to the signal from the infrared light receiving apparatus 6, so that the input operation using the remote controller 6A is possible.

It is to be noted that during the execution of the processing on the application software, the sound control unit 15 creates sound, and the speaker outputs the necessary sound.

As shown in FIG. 2, in the present embodiment, the substrate 2B can be attached/detached via the connector 50. Therefore, the substrate 2B can function as a part of the plasma control apparatus 2 with respect to another information display apparatus constituted in the same manner as in the information display apparatus 100. For example, the substrate 2B is inserted in a certain apparatus to store the information in the RAM. In the information display apparatus in which the substrate 2B is inserted, the stored information can be used to display the video. Moreover, this substrate 2B can also be used to display the video in another information display apparatus.

Furthermore, when a plurality of substrates 2B are replaced, the application software and various information stored in each substrate 2B can be used to display the video in the single information display apparatus 100.

In the present embodiment, a portion for executing computation to create the video data (the CPU 11 and video control unit 14) and a storage portion for the program necessary for displaying the video (the program of the operating system and the program of the application software) are put together in one substrate 2B. Therefore, when the corresponding substrate 2B is only used, during the display of the video, these programs can easily and securely be accessed and the necessary video can be displayed without any possibility that the information and program necessary for the video display are lost. Moreover, even with the different information display apparatus 100, the same substrate 2B is used, so that the same operation procedure can be applied to the starting or executing of the processing of the application software. For the hardware or software, it is possible to prevent a situation that a set state inadvertently changes. Furthermore, even when a plurality of information display apparatuses 100 are used, it is not necessary to consider differences of the type or version of the application software, or of the setting on the application software.

Moreover, the substrate 2B can be used as a so-called personal digital assistant (PDA) which does not include the display or power source. Since the power source or display is not disposed, the substrate 2B can be miniaturized in a mode suitable to carry. It is to be noted that a power source for exclusive use in the substrate 2B may be created to replace the power source unit 35 disposed in the information display apparatus, and a small-sized display apparatus may also be created to replace the plasma display apparatus. In this case, without using large-sized apparatuses such as the information display apparatus 100, information for video display can be stored in the substrate 2B, and the video can be confirmed. It is to be noted that with the use of the substrate 2B as the PDA, functions other than that of the video data creation apparatus of the present invention may be disposed in the substrate 2B.

It is to be noted that in the present embodiment, the substrate 2B is connected to the touch panel 5 via the connector 50. However, instead of the connection via the connector 50, a connector other than the connector 50 may be disposed in the substrate 2B, so that the substrate is connected to the panel via the other connector in an attachable/detachable manner. In this constitution, an operation for adding the touch panel 5 later is facilitated. Moreover, in a constitution in which the substrate 2B inserted in the PDP control apparatus 2 can access the other connector, the substrate 2B does not have to be detached/attached, when the touch panel 5 is attached later. This is convenient.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2002-99980 filed on Apr. 2, 2002 including the specification, claims, drawings and summary is incorporated herein by reference in its entirety.

What is claimed is:

1. A video display apparatus comprising:
a display control unit which controls a display apparatus for displaying video; and a video data creation unit which outputs video data toward the display control unit, the display control unit being connected to the video data creation unit via a connector so that the units can be attached/detached with respect to each other,
wherein the video data creation unit comprises:
a storage device which stores information;
a data creation device which uses the information recorded in the storage device to create the video data; and
a control device which controls the storage device and data creation device,
the display control unit comprises a power supply device which supplies power to the video data creation unit, and
the power supply device is connected to the video data creation unit via the connector,
wherein the display control unit further comprises:
a display apparatus which displays the video; and
a detection device which detects contact or access of a member into a display screen of the display apparatus,
wherein the detection device is connected to the control device via the connector or another connector, and
the control device controls the data creation device so that the video data is created based on the information from the detection device,
wherein the video display apparatus further comprises a receiving unit which receives a signal output from a remote controller and provides a control signal corresponding to the received signal to the display control unit and the video data creation unit,
wherein the control device controls the storage device and data creation device based on at least the control signal,
wherein the display control unit further comprises a display controlling device which controls the display apparatus and the power supply device based on at least the control signal.

2. The video display apparatus according to claim 1, wherein the data creation device creates the video data such that a track of the member is drawn in the display screen in response to the contact or access of the member detected by the detection device.

3. The video display apparatus according to claim 1, wherein a program which defines control processing by the control device is stored in the storage device.

4. The video display apparatus according to claim 1, wherein the display apparatus is a plasma display panel.

5. The video display apparatus according to claim 3, wherein the program comprises an operating system program and various application programs executed on the operating system program,
wherein the control device controls, when the power is supplied, executing the operating system program and the application program, so that the control device causes the data creation device to create the video data based on the application program.

* * * * *

UNITED STATES PATENT AND TRADEMARK OFFICE
CERTIFICATE OF CORRECTION

PATENT NO. : 7,091,962 B2  Page 1 of 1
APPLICATION NO. : 10/401687
DATED : August 15, 2006
INVENTOR(S) : Akihiro Okano et al.

It is certified that error appears in the above-identified patent and that said Letters Patent is hereby corrected as shown below:

Title Page, Item (73) Assignee: add --Pioneer Display Products Corportion, Shizuoka (JP) and Pioneer Electronics (USA) Inc., Long Beach CA--.

Signed and Sealed this

Nineteenth Day of February, 2008

JON W. DUDAS
*Director of the United States Patent and Trademark Office*